United States Patent [19]

Bischoff

[11] 4,199,872
[45] Apr. 29, 1980

[54] REGENERATION APPARATUS FOR PRODUCING SULFUR DIOXIDE

[75] Inventor: William F. Bischoff, Califon, N.J.

[73] Assignee: Foster Wheeler Energy Corporation, Livingston, N.J.

[21] Appl. No.: 831,575

[22] Filed: Sep. 8, 1977

[51] Int. Cl.² ............................................. F26B 9/06
[52] U.S. Cl. ........................................ 34/79; 34/167; 34/175; 201/12; 201/17; 202/108; 252/411 S; 432/215
[58] Field of Search .................... 34/80, 81, 167, 175, 34/79, 22, 235, 9, 12; 201/12, 17; 252/411 S; 202/99, 108; 55/98, 99, 322; 432/197, 249, 214, 215

[56] References Cited

U.S. PATENT DOCUMENTS

| | | | |
|---|---|---|---|
| 1,970,488 | 8/1934 | Butts | 183/103 |
| 2,444,990 | 7/1948 | Hemminger | 196/52 |
| 2,519,342 | 8/1950 | Berg | 183/114.2 |
| 2,819,204 | 1/1958 | Martin | 201/17 |
| 3,050,920 | 8/1962 | Norton | 34/80 |
| 3,075,559 | 1/1963 | Sharp et al. | 138/37 |
| 3,638,402 | 2/1972 | Thomas | 55/307 |
| 3,661,722 | 5/1972 | Peters et al. | 201/12 |
| 3,852,038 | 12/1974 | Corson | 201/17 |
| 3,888,642 | 6/1975 | Toyama | 55/263 |
| 4,069,107 | 1/1978 | Koppelman | 201/12 |
| 4,138,020 | 2/1979 | Steiner et al. | 214/17 C |

Primary Examiner—Larry I. Schwartz
Attorney, Agent, or Firm—Marvin A. Naigur; John E. Wilson; John J. Herguth, Jr.

[57] ABSTRACT

An apparatus for heating a carbonaceous material to produce a gas in which the carbonaceous material and a heated inert heat exchange medium are passed into a reactor vessel for mixing and for transferring the heat from the heat exchange medium to the carbonaceous material to produce gas. An outlet opening is provided through the reactor vessel for discharging the gas and an impingement plate is disposed in the interior of the vessel and extends across the outlet opening in a spaced relation thereto in the path of the gas. As a result the gas impinges against the plate before discharging from the outlet opening to separate solid particles from the gas.

4 Claims, 2 Drawing Figures

REGENERATION APPARATUS FOR PRODUCING SULFUR DIOXIDE

BACKGROUND OF THE INVENTION

This invention relates to an apparatus for heating a carbonaceous material to produce a gas, and more particularly to an apparatus for regenerating a saturated char to produce a stream of high sulfur dioxide concentration.

Hydrocarbon fuels, which are normally burned in industrial installations, such as coal and oil-fired power stations, contain sulfur which, under normal circumstances, is converted to sulfur dioxide in the combustion process. Although in older installations the sulfur dioxide was vented to atmosphere with the other effluent gases from the process, recent air pollution control requirements have placed great emphasis on removing the sulfur dioxide from the gases before the latter are expelled into the atmosphere. One successful technique in this respect is to remove the sulfur dioxide from polluted gas streams by adsorption on carbon to form a saturated char followed by a regeneration of the saturated char to produce a stream of high sulfur dioxide concentration.

The regeneration of the saturated char is often accomplished by thermal regeneration, in which the saturated char is contacted with an inert, head exchange medium, such as sand, which has been heated to a predetermined elevated temperature. The sand does not take part in the reactions occurring within the regenerator, but rather simply functions to supply heat so that the reactions may take place. As the char becomes heated, the reactions that occurred during the adsorption process are reversed, producing a concentrated stream of sulfur dioxide, water, carbon dioxide and nitrogen.

In a typical regeneration process the mixture of the hot sand or heat exchange medium and the char flows slowly down through the regeneration vessel, with the flow being controlled by a char-sand separator/feeder positioned below the discharge hopper of the vessel.

With this type of thermal regeneration, a regeneration temperature with a high, heating velocity can be achieved. This results in a regeneration vessel of small volume and a short char residence time.

In this regeneration process the sulfur dioxide rich gas normally is drawn out by an induced draft fan through an outlet opening formed in the upper portion of the reactor vessel. However, in these arrangements some of the sand, or other heat exchange medium, is sometimes fluidized by the gas and hence carried out of the regenerator through the outlet opening. This of course reduces the efficiency of the system in addition to requiring external separation of the sand and addition of new sand to the system.

SUMMARY OF THE INVENTION

It is therefore an object of the present invention to provide an apparatus for heating a carbonaceous material to produce a gas which enjoys an increased efficiency and minimizes the other problems associated with entrainment of the heat exchange medium within the gas.

It is a further object of the present invention to provide an apparatus of the above type in which the heat exchange medium is separated from the off-gas before the latter is discharged from the reactor vessel.

It is a further object of the present invention to provide an apparatus of the above type in which an impingement plate plate is provided in the path of the gas exiting from the vessel for separating the heat exchange medium from the gas before the latter passes from the vessel.

Toward the fulfillment of these and other objects of the present invention the apparatus of the present invention comprises a reactor vessel into which a carbonaceous material and a heated inert heat exchange medium are introduced for mixing and transferring the heat from the heat exchange medium to the carbonaceous material to produce a gas. The vessel has an outlet opening for the discharge of the gas, and an impingement plate is disposed in the interior of the vessel and extends across the outlet opening in a spaced relation thereto in the path of the gas. As a result the gas impinges against the plate before discharging from the outlet opening to separate any solids therefrom.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings wherein.

DESCRIPTION OF THE PREFERRED EMBODIMENT

Figures 1, 2:
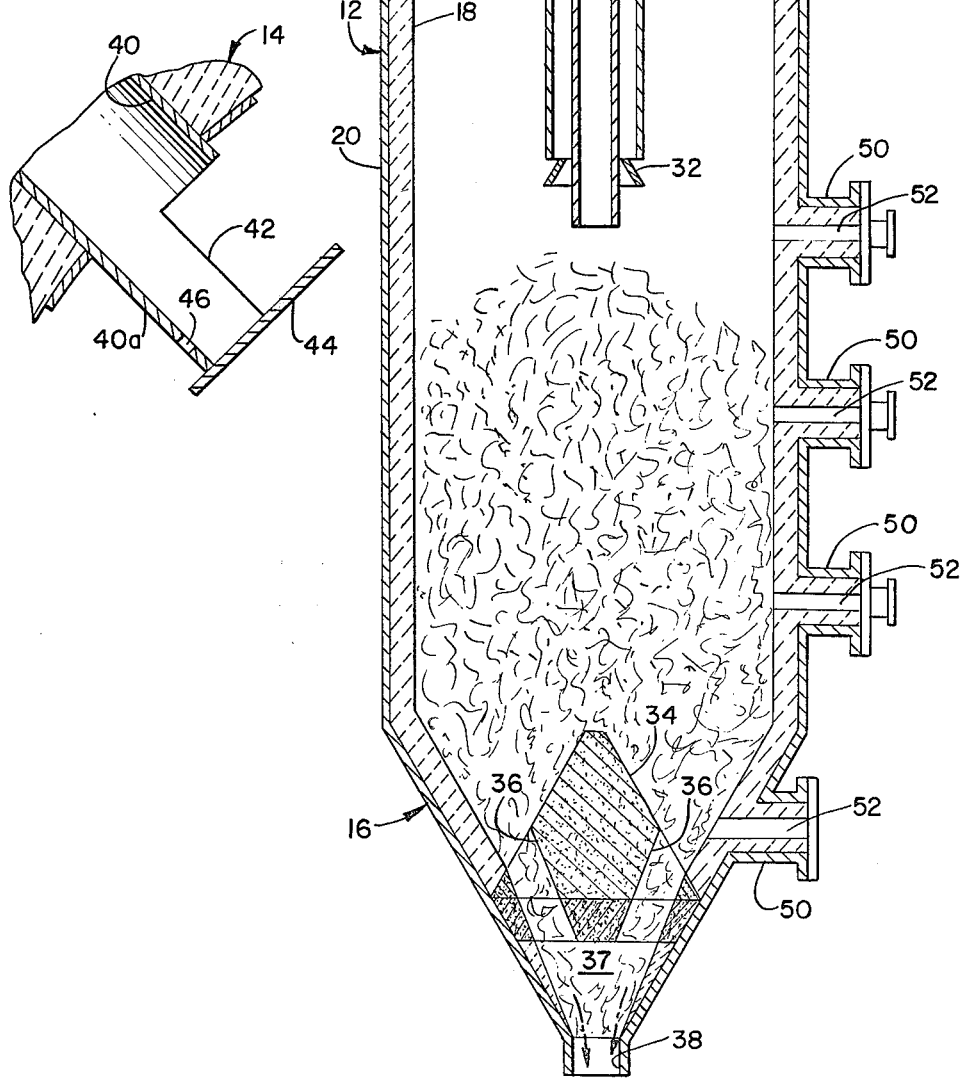
FIG. 1 is a vertical cross-sectional view depicting the apparatus of the present invention.
FIG. 2 is an enlarged view of a portion of the apparatus of FIG. 1.

Referring to FIG. 1, the reference numeral 10 refers in general to a reactor vessel which has a generally cylindrical main body portion 12, an upper hemispherical portion 14 and a lower conical portion 16 all of which are formed integral by a refractory material 18 surrounded by a metallic shell 20.

The vessel 10 is oriented in a vertical direction and an opening is formed through the upper portion of the hemispherical vessel portion 14 and receives an inlet pipe 22. One end of the pipe 22 has a funnel shaped intake portion 24 formed integral therewith and the other end of the pipe terminates within the interior of the vessel at a point intermediate the ends thereof. An outer inlet pipe 26 extends through the inlet opening defined in the upper portion of the hemispherical vessel portion 14 and surrounds a substantial portion of the inlet pipe 22. The inlet pipe 26 extends coaxially with respect to the inlet pipe 22 in a spaced relation thereto to define an annular passage 28. An angularly extending intake portion 30 is supported at one end of the inlet pipe 26, and a flared outlet 32 is provided at the discharge end of the passage 28. As a result of this configuration a carbonaceous material, such as saturated char, can be introduced into the intake portion 30 of the pipe 26 and a heated inert heat exchange medium, such as sand can be introduced into the intake portion 24 of the pipe 22. The char passes downwardly under the action of gravity through the pipe 26 and the passage 28, before discharging into the interior of the vessel 10 while the sand passes downwardly in mass flow through the interior of pipe 22, before also discharging into the interior of the vessel.

The saturated char and heated sand accumulate in the lower portion of the vessel where they generally mix and exchange heat to raise the temperature of the char to predetermined levels as will be described in detail later.

A flow distribution cone 34 is supported by the conical vessel portion 16, and operates to regulate the uniformity of the flow of the char-sand mixture discharging from the vessel 10. The configuration of the flow distribution cone 34 resembles two, separate, truncated conical sections which are joined together at their base surfaces, with the outer surface of the lower conical section being shaped to conform to the inner, conical surface of the conical vessel portion 16 and the upper conical section extending upwardly into the interior volume of the vessel 10. A plurality of elongated openings 36 extend longitudinally through the cone 34, with the lower portion of each opening in fluid communication with a flow chamber 37 formed immediately below the cone and within the conical vessel portion 16. The flow chamber 37, in turn, is in fluid communication with a discharge opening 38 provided at the bottom of the conical vessel portion 16 for continuously discharging the mixture of char and sand after it passes through the vessel 10.

Further details of the flow distribution cone 34 are disclosed in U.S. patent application Ser. No. 796,634, filed on May 13, 1977 now U.S. Pat. No. 4,138,020 and assigned to the same assignee as the present invention, with the disclosure of the latter application hereby being incorporated by reference.

An outlet opening is provided through the hemispherical vessel portion 14 and receives a discharge pipe 40 which is better shown with reference to FIG. 2. In particular, the pipe 40 has an inlet portion 40a which projects selected distance along its axis inwardly from the inner wall of the hemispherical vessel portion 14 with an upwardly facing portion of the wall of the inlet portion 40a being removed to define an inlet opening 42. An impingement plate 44 is mounted generally transverse to the end of the inlet portion 40a and a drain opening 46 is provided through the latter portion in a slightly spaced relationship to the impingement plate 44 for reasons to be explained in detail later. As shown in FIG. 2, the drain opening 46 is smaller than the inlet opening 42 and faces downwardly.

A plurality of thermowells 50 are formed on the cylindrical vessel portion 12 in an axially spaced relationship. Each thermowell 50 contains a multiplicity of thermocouples 52 for measuring temperature within the vessel in a conventional manner. An additional thermowell 50 is provided in the conical vessel portion 16 and also contains a plurality of thermocouples 52 which perform the same function. It is understood that additional thermowells and thermocouples may be circumferentially spaced around the vessel 10 as needed.

As discussed above, the apparatus of the present invention is for use in a system designed to remove sulfur dioxide from effluent gases formed in coal or oil-fuel power stations, or the like. Prior to the operation of the apparatus of the present invention, the effluent gases are passed over an adsorbent material, such as activated char, or preoxidized bituminous coal. The sulfur dioxide contained in the gas stream is adsorbed on the inner surface of the adsorbant and undergoes subsequent oxidation to sulfuric acid in the presence of the oxygen and water vapor also present in the effluent gas. The adsorbant, or saturated char, is then discharged from the adsorber and separated from particles before being passed to the vessel 10.

In operation of the apparatus of the present invention, the saturated char containing sulfuric acid is introduced in the inlet portion 30 of the inlet pipe 26 whereby it flows downwardly under the action of gravity and discharges into the interior of the vessel 10. Similarly, hot sand which has been heated to a predetermined elevated temperature, such as 1500° F., is introduced through the inlet portion 24 of the pipe 22 and flows downwardly in mass flow before discharging into the interior of the vessel 10.

The saturated char and the hot sand accumulate and mix in the interior of the vessel whereby the heat of the sand is transferred to the char. As the saturated char becomes heated the reactions that occurred during the aforementioned adsorption process are reversed which produce a concentrated off gas in the form of sulfur dioxide, water, carbon dioxide and nitrogen. An accumulation of the mixture of char and sand is formed in the lower half of the vessel 10 as shown by the drawings, and continuously discharges from the bottom of the conical portion 16 through the discharge opening 38 after passing through the openings 36 in the cone 34 and through the flow chamber 37, to insure an even distribution of the mixture and a flow of uniform velocity. The sand can then be separated from the char and returned to an external unit for reheating before passing back into the intake pipe 24, and the char can be passed to another external unit for adsorbing additional sulfur dioxide as discussed above.

The off-gas generated during the above process passes upwardly into the upper portion of the vessel by a draft induced by an external fan (not shown) and impinges against the plate 44 before passing around the plate and through the inlet opening 42 of the discharge pipe 40 and discharging through the pipe. The off-gas can be collected and treated further if desired to reduce the sulfur dioxide in the gas to elemental sulfur.

As a result of the impingement of the off-gas against the plate 44 any solid materials including sand, char, ash or the like, entrained in the gas and having a greater density than the gas will fall back into the vessel due to their larger inertia while the gas flows upwardly and out. As a result the gas discharge from the vessel is substantially free of any solid particulate materials. Any solids accumulating around the interior of the discharge pipe 40 will discharge through the opening 46 and back to the interior of the vessel under gravity.

The production of the substantially solid-free off gas increases the efficiency and economics of the regeneration process.

It is understood that the apparatus of the present invention is not limited to treatment of a saturated char of the type described above but can also be used in other similar applications.

Of course, other variations of the specific construction and arrangement of the apparatus disclosed above can be made by those skilled in the art without departing from the invention as defined in the appended claims.

What is claimed is:

1. An apparatus for heating a carbonaceous material to produce a gas, said apparatus comprising a reactor vessel, means for introducing said carbonaceous material and a heated inert heat exchange medium into said vessel for mixing and transferring the heat from said heat exchange medium to said carbonaceous material to produce a gas, said vessel having an outlet opening located above the level of said heat exchange medium and said carbonaceous material for the discharge of said gas, a gas discharge conduit located in said outlet opening and having a projecting portion that extends along a conduit axis a selected distance into said vessel, and an impingement plate located at the end of said projecting portion of said gas discharge conduit, said impingement plate extending across said outlet opening in spaced relation thereto in a plane substantially transverse to said conduit axis and in the path of said gas, said gas discharge conduit having a first opening formed in an upwardly facing surface portion of said projecting portion thereof and a second, smaller opening formed in a downwardly facing surface portion of said projecting portion, said discharge gas impinging against said plate to separate solids therefrom before flowing through said first opening and through said discharge conduit and any gas-entrained solids passing through said first opening and collecting in said projecting portion draining from said projecting portion through said second opening.

2. The apparatus of claim 1, wherein said vessel has an inlet opening and wherein said introducing means comprises a first inlet pipe extending through said inlet opening and terminating in the interior of said vessel for receiving said inert heat exchange medium, a second inlet pipe extending through said inlet opening for receiving said carbonaceous material, said second inlet pipe surrounding said first inlet pipe and terminating in the interior of said vessel.

3. The apparatus claimed in claim 1 wherein said projecting portion of said gas discharge conduit has another opening formed therein, said other opening functioning as a drain for solid materials collecting in said gas discharge conduit.

4. The apparatus claimed in claim 1 wherein said gas discharge conduit is aligned along a conduit axis which is inclined relative to a reactor vessel axis.

* * * * *